United States Patent
Radloff et al.

(10) Patent No.: US 10,404,842 B2
(45) Date of Patent: Sep. 3, 2019

(54) SYSTEM AND METHOD OF OPERATING INFORMATION HANDLING SYSTEMS

(71) Applicant: Dell Products L.P., Round Rock, TX (US)

(72) Inventors: Timothy M. Radloff, Austin, TX (US); Geroncio O. Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/813,812

(22) Filed: Nov. 15, 2017

(65) Prior Publication Data

US 2019/0149643 A1 May 16, 2019

(51) Int. Cl.
*H04B 1/3827* (2015.01)
*H04M 1/02* (2006.01)
*G06F 1/16* (2006.01)

(52) U.S. Cl.
CPC ........ *H04M 1/0249* (2013.01); *G06F 1/1616* (2013.01); *G06F 1/1626* (2013.01); *H04M 1/0214* (2013.01); *H04M 1/0254* (2013.01); *H01H 2300/032* (2013.01)

(58) Field of Classification Search
CPC ............. H04M 1/0249; H04M 1/0254; H04M 1/0214; H04B 5/0025; H04B 5/0043; H04B 1/3838; H04W 4/38; G06F 1/1616; G06F 1/1626; H01H 2300/032
See application file for complete search history.

(56) References Cited

U.S. PATENT DOCUMENTS

| | | | |
|---|---|---|---|
| 8,583,953 B2* | 11/2013 | Sultenfuss | G06F 1/3203 713/320 |
| 2012/0096207 A1* | 4/2012 | Chen | G06F 13/122 710/303 |
| 2013/0331046 A1* | 12/2013 | Hawaka | H04W 52/18 455/127.1 |
| 2014/0249690 A1* | 9/2014 | Park | G06F 1/206 700/300 |
| 2014/0361995 A1* | 12/2014 | Halim | G06F 1/1698 345/173 |
| 2016/0313777 A1* | 10/2016 | Ragupathi | G06F 1/26 |
| 2016/0365886 A1* | 12/2016 | Prendergast | H04B 1/3838 |
| 2017/0187198 A1* | 6/2017 | Leabman | H02J 5/005 |
| 2018/0103436 A1* | 4/2018 | Hawaka | H04B 1/3827 |

* cited by examiner

*Primary Examiner* — Andrew Wendell
(74) *Attorney, Agent, or Firm* — Baker Botts L.L.P.

(57) ABSTRACT

In one or more embodiments, an information handling system may determine that a housing is in contact with the information handling system that is operating with a first operating profile. For example, the housing may be or include a case or a cover. In response to determining that the housing is in contact with the information handling system, the information handling system may determine a second operating profile of the information handling system that increases a processing speed of at least one processor of the information handling system. In one or more embodiments, the second operating profile may be or include a thermal profile that permits the information handling system to have an increased skin temperature of at least a portion of the information handling system. In one or more embodiments, the information handling system may operate based at least on the second operating profile.

20 Claims, 12 Drawing Sheets

SYSTEM AND METHOD OF OPERATING INFORMATION HANDLING SYSTEMS

BACKGROUND

Field of the Disclosure

This disclosure relates generally to information handling systems and more particularly to operating characteristics of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, an information handling system, operating with a first operating profile, may determine that a housing is in contact with the information handling system. In one example, the housing may be or include a case or a cover. In another example, the first operating profile may be or include a first power profile that permits a skin temperature of at least a portion of the information handling system to be at or below a first temperature. In one or more embodiments, determining that the housing is in contact with the information handling system may include utilizing at least one of multiple pogo pins, at least one mechanical switch, at least one magnetic sensor, a near field communication sensor, and user input, among others. In one or more embodiments, the information handling system may receive user input that indicates that the housing is in contact with the information handling system. In response to determining that the housing is in contact with the information handling system, the information handling system may determine a second operating profile of the information handling system that increases a processing speed of at least one processor of the information handling system.

In one or more embodiments, determining the second operating profile of the information handling system that increases the processing speed of the at least one processor of the information handling system may be based at least on a type of the housing. In one or more embodiments, determining the second operating profile of the information handling system that increases the processing speed of the at least one processor of the information handling system may be based at least on an identification of the housing. In one or more embodiments, determining a type of the housing may include utilizing at least one of multiple pogo pins, multiple mechanical switches, multiple magnetic field sensors, a near field communication sensor, and user input, among others. In one or more embodiments, determining the type of a housing may include utilizing the identification of the housing. In one or more embodiments, determining a type of the housing may be based at least on the identification of the housing. In one or more embodiments, the information handling system may receive user input that indicates the type of the housing. In one or more embodiments, determining an identification of the housing may include utilizing at least one of multiple pogo pins, multiple mechanical switches, multiple magnetic field sensors, a near field communication sensor, and user input, among others. In one or more embodiments, the second operating profile may be or include a thermal profile that permits the information handling system to have an increased skin temperature of at least a portion of the information handling system. In one or more embodiments, the information handling system may operate based at least on the second operating profile.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
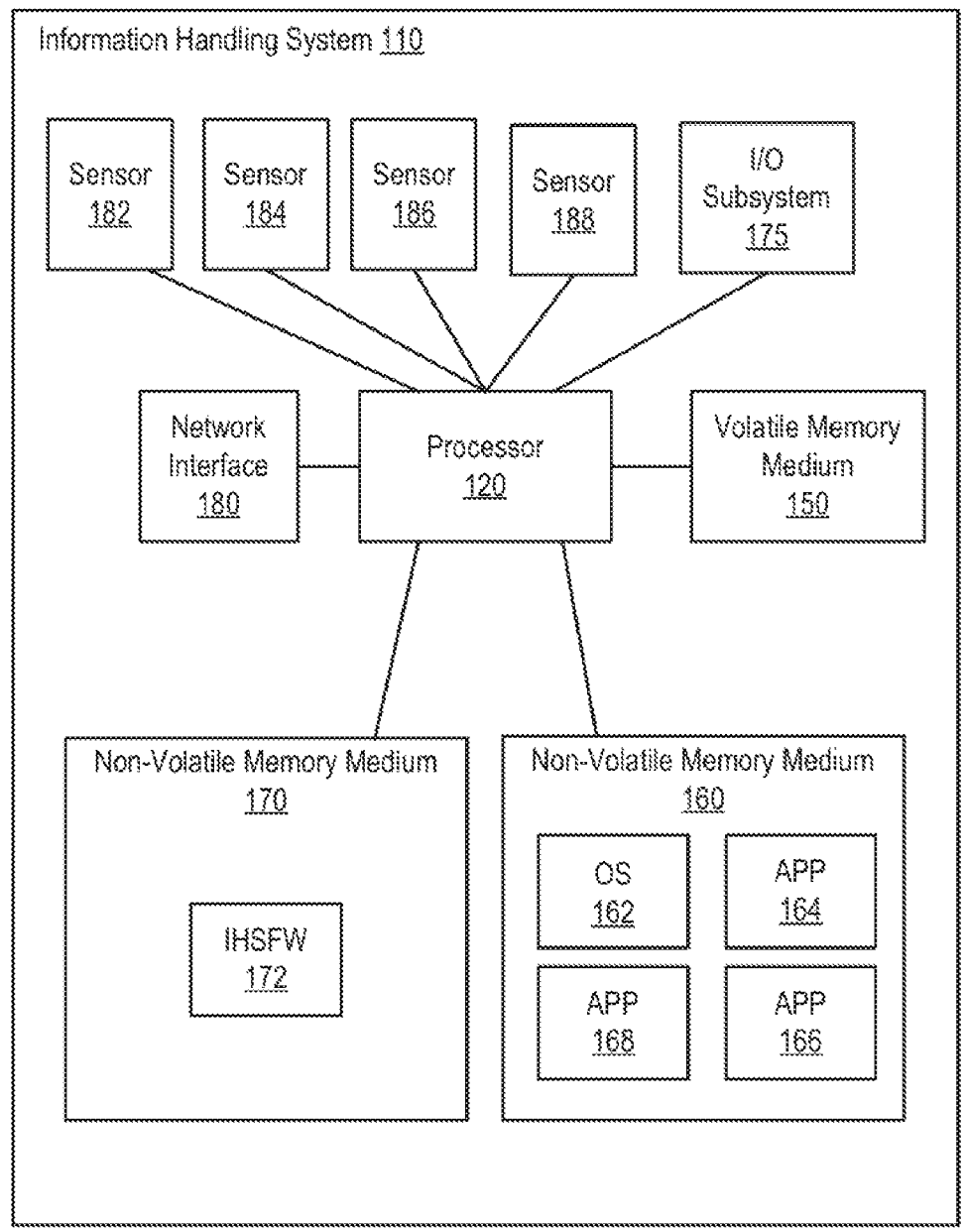
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, a housing may be applied to and/or mated with an information handling system. For example, the housing may be or include one or more of a case and a cover, among others. For instance, the housing may provide additional resistance, additional conductance, and/or additional insulation. In one or more embodiments, the housing may insulate a user and/or an object in contact with the information handling system from a skin temperature increase of at least a portion of the information handling system. For example, insulating the user and/or the object may be based at least on one or more of a material of the housing and a thickness of the material of the housing, among others. For instance, the material of the housing may include one or more of carbon fiber, fiberglass, biomaterial, non-metallic material, plastic, metal, and rubber, among others. In one or more embodiments, the housing may include one or more elements and/or materials that may aid in heat dissipation and/or heat conductance. In one example, the housing may include one or more fans that may aid in heat dissipation. In another example, one or more materials of the housing may transfer heat from one or more areas of the housing to one or more others areas of the housing.

In one or more embodiments, the housing may include an elastomer. In one or more embodiments, an elastomer may be a polymer with elasticity. For example, the elastomer may be or include rubber. For instance, the rubber may be or include a vulcanisate. In one or more embodiments, the elastomer may be relatively soft and/or deformable at room temperatures (e.g., around seventy-two degrees Fahrenheit). In one or more embodiments, the elastomer may be utilized in damping and/or insulating one or more elements. For example, the elastomer may be utilized in insulating at least a portion of an information handling system. For example, at least a portion of a housing for an information handling system may include an elastomer that may insulate at least a portion of the information handling system. In one or more embodiments, a housing may include a metal and/or a metallic compound.

In one or more embodiments, the housing may permit a skin temperature of at least a portion of the information handling system to be increased. For example, one or more elements of the information handling system may produce heat, which may contribute to the skin temperature of the at least the portion of the information handling system. For instance, if the skin temperature of the at least the portion of the information handling system can be increased, the one or more elements of the information handling system may produce additional heat, and at least one of the one or more elements of the information handling system may be permitted to increase one or more performances. In one or more embodiments, increasing one or more performances of one or more elements of the information handling system may increase information processing performance of the information handling system. For example, a speed of at least one processor of the information handling system may be increased. In one instance, increasing the processor speed of the at least one processor of the information handling system may permit the information handling system to process additional information in a time period, that the information handling system may not otherwise be permitted to process in the time period. In another instance, increasing the processor speed of the at least one processor of the information handling system may permit the information handling system to process information in a shorter time period, than the information handling system would otherwise.

In one or more embodiments, an information handling system may determine if a housing has been applied to and/or mated with at least a portion of the information handling system. For example, the information handling system may determine that a housing has been applied to and/or mated with at least a portion of the information handling system, and the information handling system may increase one or more performances in processing information. For instance, the information handling system may increase a speed of at least one processor of the information handling system in response to determining that that a housing has been applied to and/or mated with at least a portion of the information handling system. In one or more embodiments, the information handling system may determine a type of housing. For example, the information handling system may determine an identification associated with the housing. In one or more embodiments, the information handling system may alter a thermal control solution based at least on the identification associated with the housing. For example, the altered thermal control solution may permit an information processing speed increase. For instance, a speed of at least one processor of the information handling system may be increased, based at least on the altered thermal control solution, which may boost performance of the information handling system.

In one or more embodiments, an information handling system may determine that a housing has been applied to and/or mated with at least a portion of the information handling system via pogo pins, at least one magnetic field sensor, at least one mechanical switch, near field communication, and/or user input, among others. In one example, the information handling system may utilize pogo pins to receive information from the housing. For instance, the information may indicate a type of housing and/or an identification of the housing. In a second example, the housing may include at least one magnet, and the information handling system may utilize the at least one magnetic field sensor to determine that the housing has been applied to and/or mated with at least a portion of the information handling system. In a third example, the at least one mechanical switch may be actuated by mating and/or applying the housing to the information handling system. For instance, actuating one or more of multiple switches may indicate a type and/or an identification of the housing. In a fourth example, the housing may include a radio frequency identification (RFID) device, and the information handling system may determine that the housing has been applied to and/or mated with at least a portion of the information handling system. For instance, the information handling system may determine a type and/or an identification associated with the housing based at least on information from the RFID device. In another example, the information handling system may receive user input that may indicate that the housing has been applied to and/or mated with at least a portion of the information handling system. For instance, the user input may indicate a type and/or an identification of the housing.

In one or more embodiments, the information handling system may include one or more radio frequency (RF) transmitters and/or one or more antennas coupled to the one or more RF transmitters. For example, the RF transmitters may be utilized in transmitting information in a wireless fashion via the one or more antennas. For instance, the one or more RF transmitters may include one or more WiFi transmitters, one or more Bluetooth transmitters, one or more cellular telephone transmitters, etc. In one or more embodiments, the information handling system may determine that a human is close and/or proximate to the information handling system and, in response to that determination, may reduce an amount of power utilized by the RF transmitters. For example, the information handling system may reduce the amount of power utilized by the RF transmitters to comply with a specific absorption rate (SAR) that may be considered safe and/or acceptable for a human. In one or more embodiments, a housing applied to the information handling system may permit and/or allow the one or more RF transmitters to utilize more power in RF transmissions. For example, the information handling system with the one or more RF transmitters may detect that the housing has been applied to the information handling system. In one instance, in response to detecting that the housing has been applied to the information handling system, the information handling system may not reduce an amount of power utilized by the one or more RF transmitters. In another instance, in response to detecting that the housing has been applied to the information handling system, the information handling system may not reduce the amount of power utilized by the one or more RF transmitters as much compared to if the housing was not applied to the information handling system. In one or more embodiments, by not reducing RF transmission power or not reducing as much RF transmission power, the information handling system may perform better in one or more wireless communications.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and sensors 182-188. As illustrated, volatile memory medium 150, non-volatile memory media 160 and 170, I/O subsystem 175, network interface 180, and sensors 182-188 may be communicatively coupled to processor 120. In one or more embodiments, each of one or more of sensors 182-188 may include multiple sensors.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
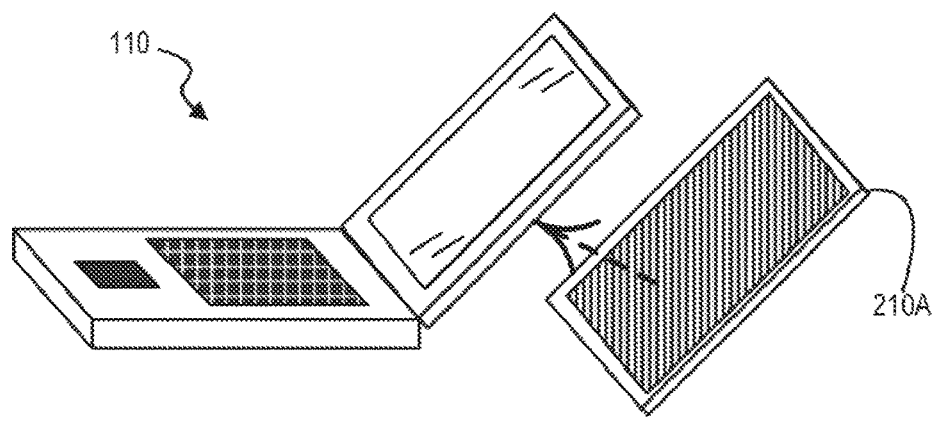
FIGS. 2A-2C illustrate examples of mating a housing with at least a portion of an information handling system, according to one or more embodiments.
Figure 2B:
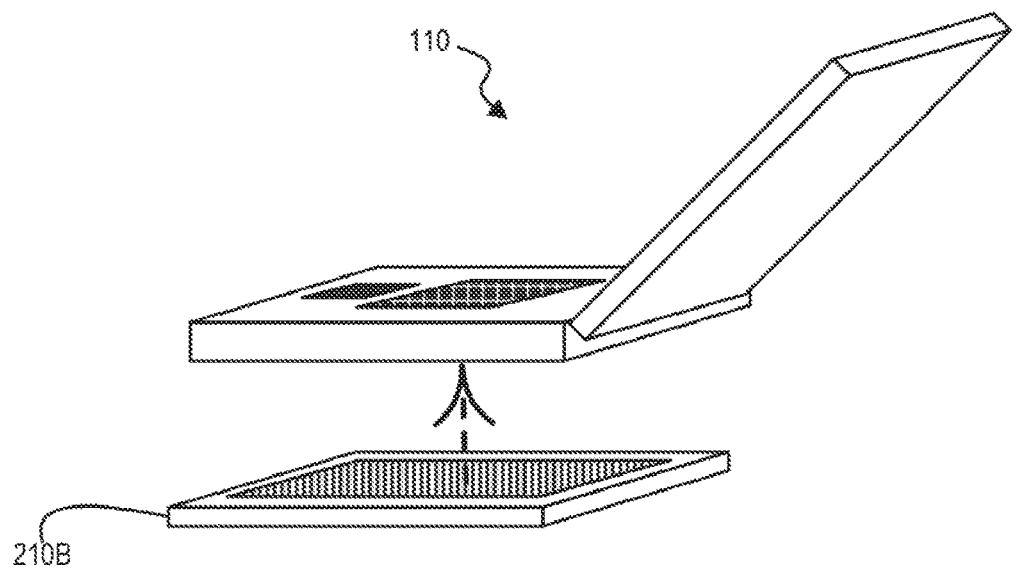
Figure 2C:
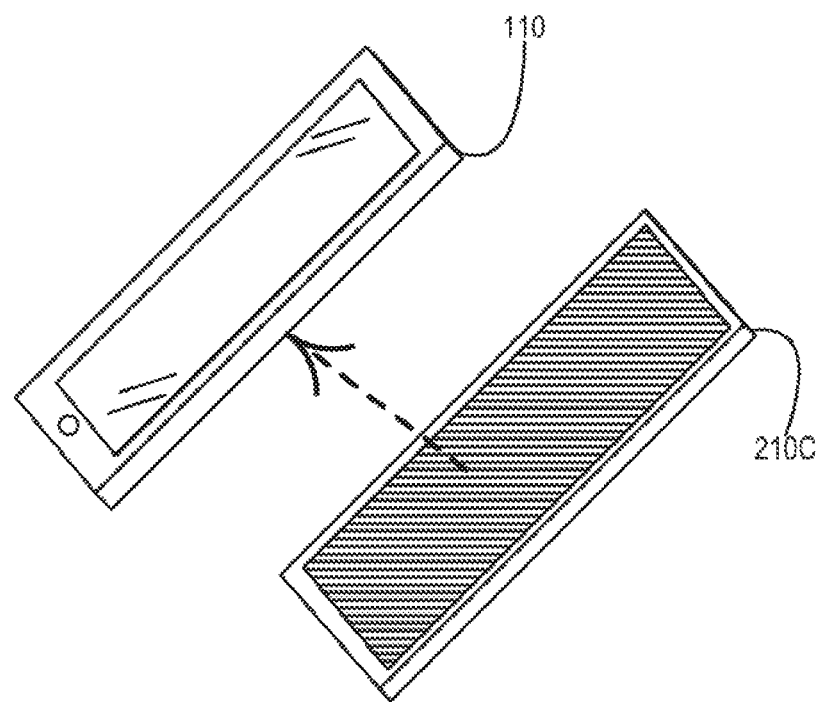

Turning now to FIGS. 2A-2C, examples of mating a housing with at least a portion of an information handling system are illustrated, according to one or more embodiments. As shown in FIG. 2A, a housing 210A may be mated with a top portion of IHS 110. As illustrated in FIG. 2B, a housing 210B may be mated with a bottom portion of IHS 110. For example, 110 may be a laptop computing device. As shown in FIG. 2C, a housing 210C may be mated with a bottom portion and/or a back portion of IHS 110. For example, IHS 110 may be or include one or more of a mobile device, a PDA, a consumer electronic device, an electronic music player, an electronic video player, a tablet computing device, a wireless telephone, and a smartphone, among others.

Figure 3A:
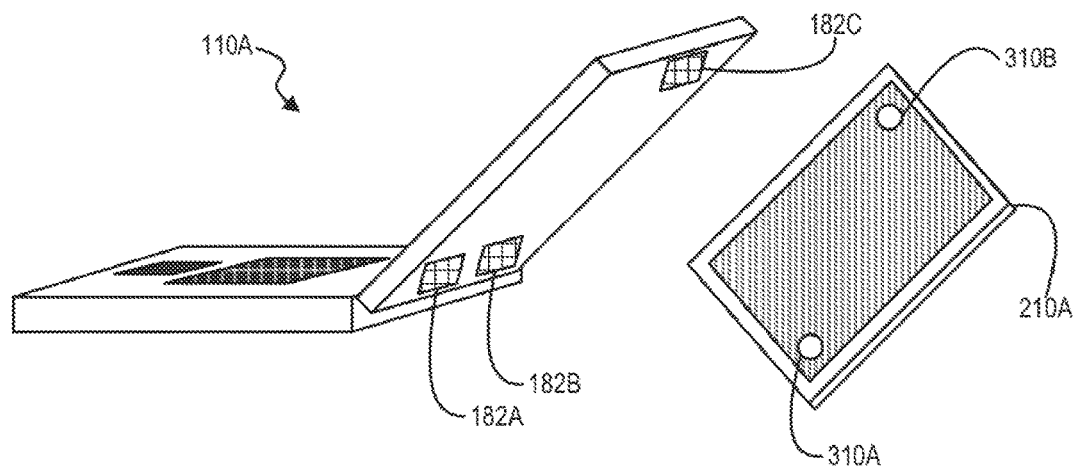
FIGS. 3A and 3B illustrate examples of an information handling system that includes magnetic field sensors, according to one or more embodiments.
Figure 3B:
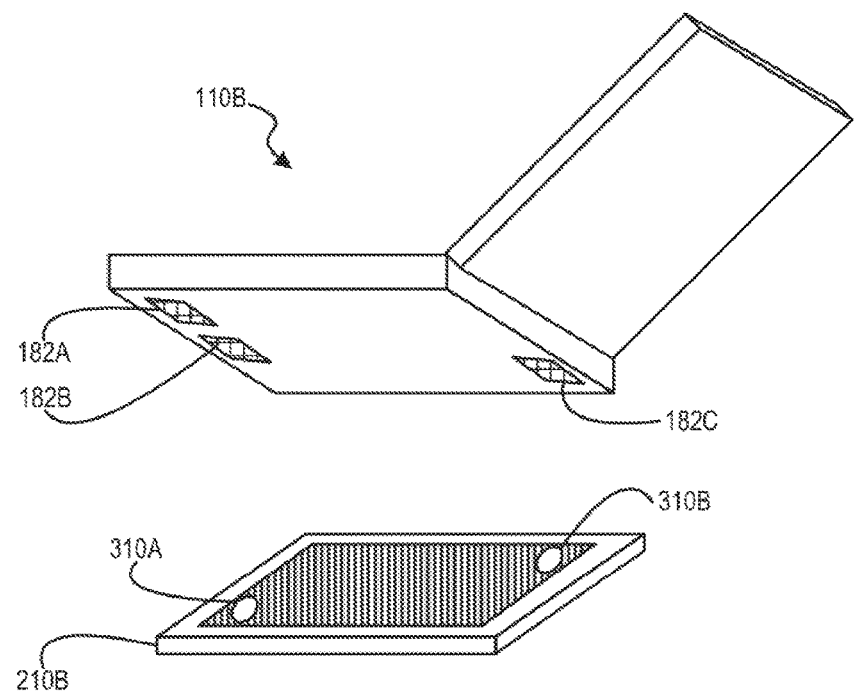

Turning now to FIGS. 3A and 3B, examples of an information handling system that includes magnetic field sensors are illustrated, according to one or more embodiments. As shown in FIG. 3A, IHS 110A may include magnetic field sensors 182A-182C on a top lid of IHS 110. As illustrated in FIG. 3B, IHS 110B may include magnetic field sensors 182A-182C on a bottom lid of IHS 110B. In one example, embodiments, magnetic field sensors 182A-182C may be or include Hall effect sensors. In another example, magnetic field sensors 182A-182C may include reed switches. As shown, housing 210 may include magnets 310A and 310B. In one or more embodiments, IHS 110 may sense and/or determine a presence of magnets 310A and 310B via magnetic field sensors 182A and 182B. For example, presence of one or more magnets may indicate a type of housing and/or an identification of a housing.

Figure 3C:
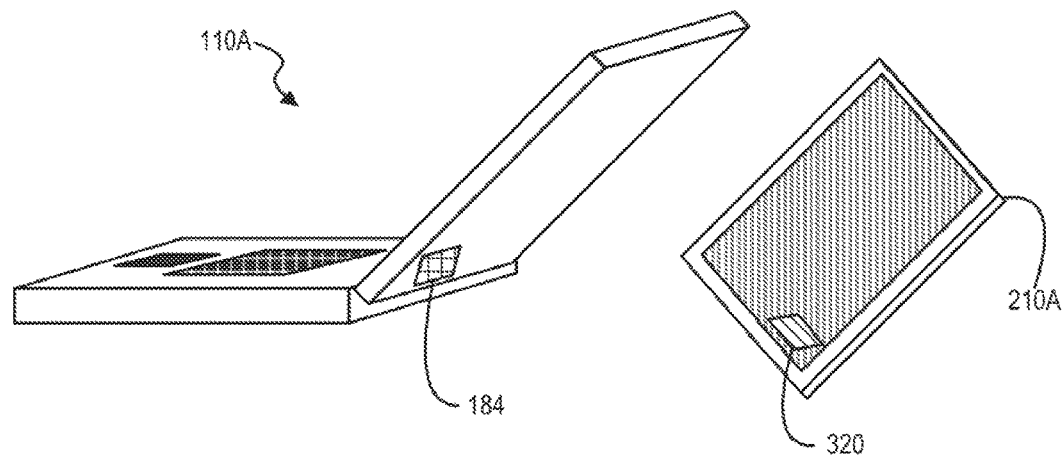
FIGS. 3C and 3D illustrate examples of an information handling system that includes a near field communication sensor, according to one or more embodiments.
Figure 3D:
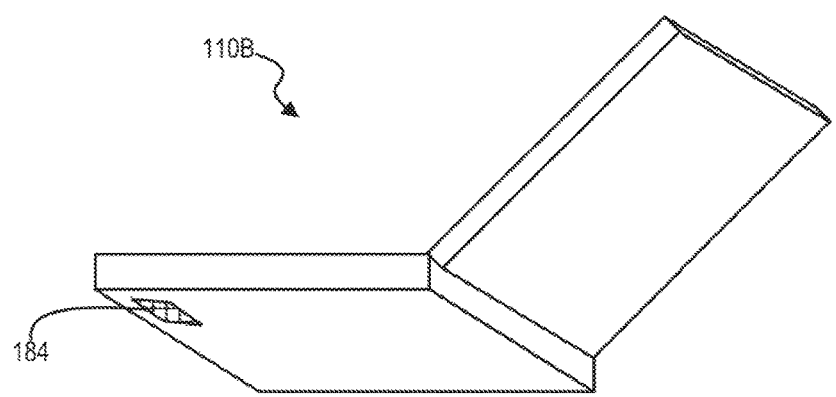
Figure 3D:
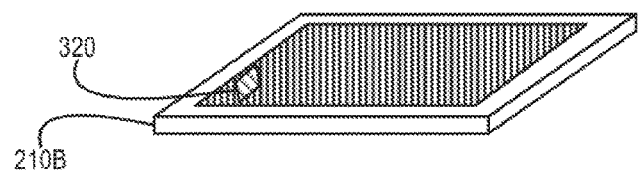

Turning now to FIGS. 3C and 3D, examples of an information handling system that includes a near field communication sensor are illustrated, according to one or more embodiments. As shown in FIG. 3C, IHS 110A may include near field communication sensor 184 on a top lid of IHS 110A. As illustrated in FIG. 3B, IHS 110B may include near field communication sensor 184 on a bottom lid of IHS 110B. In one or more embodiments, housing 210 may include a RFID device 320. In one example, IHS 110 may receive information from RFID device 320, via near field communication sensor 184, that indicates a type of housing. In another example, 110 may receive information from RFID device 320, via near field communication sensor 184, that indicates an identification of housing.

Figure 3E:
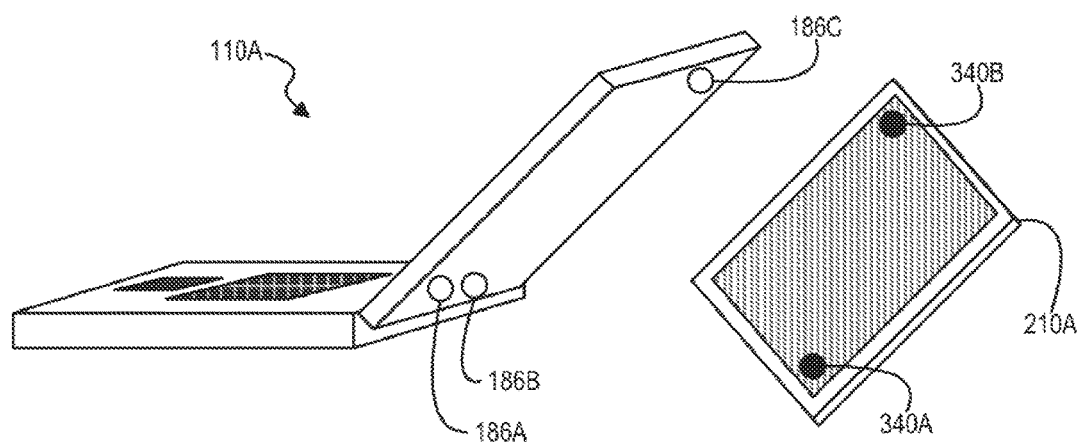
FIGS. 3E and 3F illustrate examples of an information handling system that includes mechanical sensors, according to one or more embodiments.
Figure 3F:
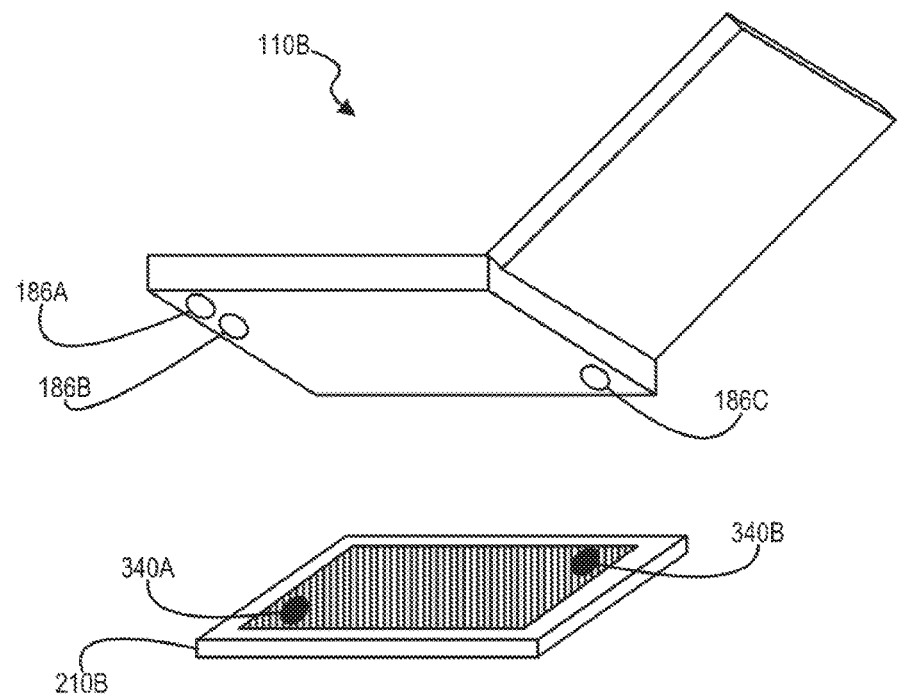

Turning now to FIGS. 3E and 3F, examples of an information handling system that includes mechanical sensors are illustrated, according to one or more embodiments. As shown in FIG. 3E, IHS 110A may include mechanical sensors 186A-186C on a top lid of IHS 110A. As illustrated in FIG. 3B, IHS 110B may include mechanical sensors 186A-186C on a bottom lid of IHS 110B. For example, embodiments, mechanical sensors 186A-186C may be or include switches. In one instance, one or more of mechanical sensors 186A-186C may be normally open. In another instance, one or more of mechanical sensors 186A-186C may be normally closed. In one or more embodiments, housing 210 may include one or more voids that may be utilized to not actuate respective one or more of mechanical sensors 186A-186C. For example, housing 210 may include one or more voids 340A and 340B. In one instance, housing 210 may not actuate mechanical sensors 186A and 186C via respective voids (e.g., holes) 340A and 340B. In another instance, housing 210 may actuate mechanical sensor 186B. In one or more embodiments, IHS 110 may sense and/or determine a presence of housing 210 via one or more of mechanical sensors 186A-186C. In one or more embodiments, actuating and/or not actuating of one or more of mechanical sensors 186A-186C may indicate a type of housing and/or an identification of a housing.

Figure 3G:
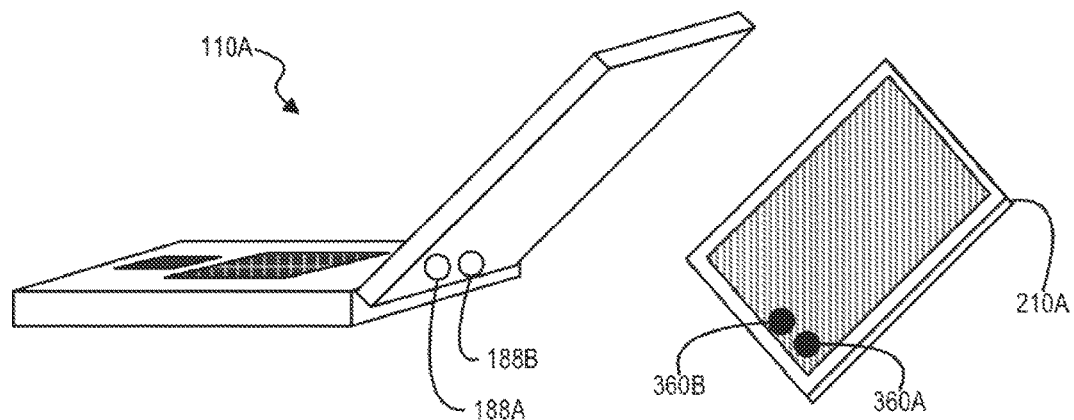
FIGS. 3G and 3H illustrate examples of an information handling system that includes pogo pin sensors, according to one or more embodiments.
Figure 3H:
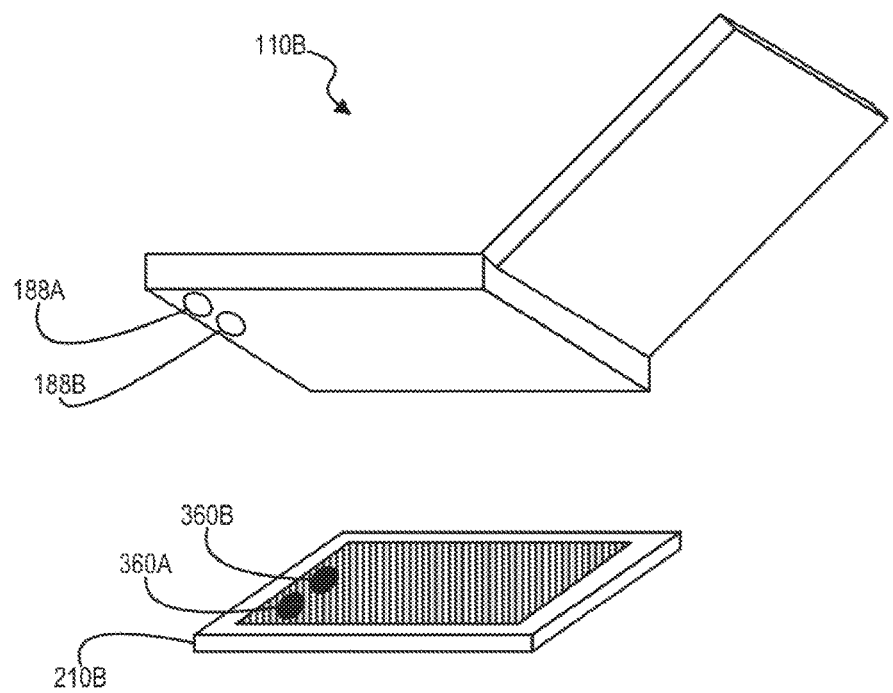

Turning now to FIGS. 3G and 3H, examples of an information handling system that includes pogo pin sensors are illustrated, according to one or more embodiments. As shown in FIG. 3G, IHS 110A may include pogo pin sensors 188A and 188B on a top lid of IHS 110A. As illustrated in FIG. 3H, IHS 110B may include pogo pin sensors 188A and 188B on a bottom lid of IHS 110B. In one or more embodiments, a pogo pin sensor may be or include one or more springs and/or one or more conductors, among others. As shown, housing 210A may include conductors 360A and 360B. In one or more embodiments, IHS 110 may communicate with housing 210A via pogo pin sensors 188A and 188B and conductors 360A and 360B. For example, IHS 110 may receive information via communicating with housing 210, and the received information may indicate a type of housing and/or an identification of a housing. For instance, housing 210 may include a processor and/or circuitry that may provide the information to IHS 110. In one or more embodiments, housing 210A may include a fan (not specifically illustrated). For example, IHS 110A may provide information, via one or more of pogo pin sensors 188A and 188B, to housing 210A that may be utilized to control the fan (e.g., turning the fan on, turning the fan off, controlling a speed of the fan, etc.).

Figure 3I:
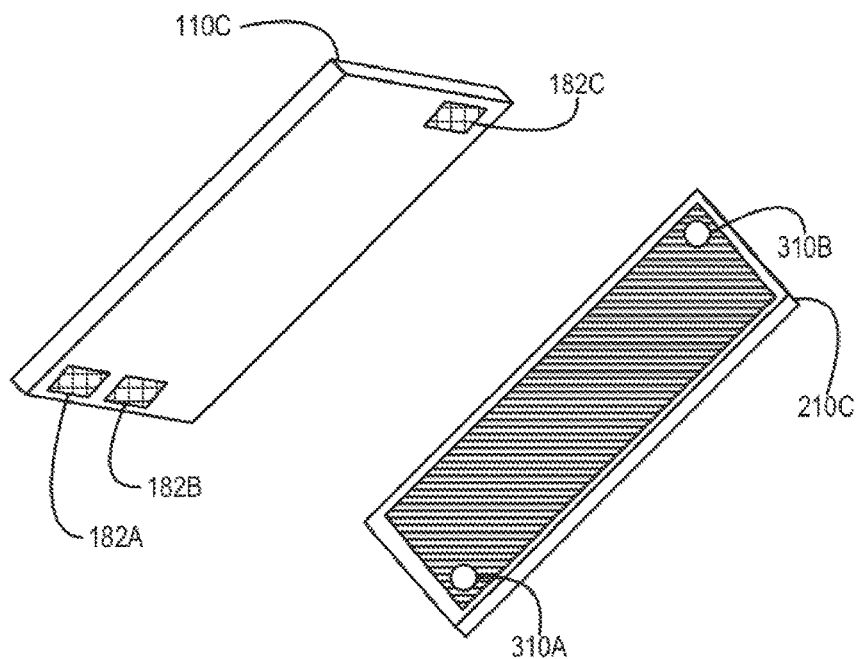
FIG. 3I illustrates an example an information handling system that includes magnetic field sensors, according to one or more embodiments.

Turning now to FIG. 3I, an example an information handling system that includes magnetic field sensors is illustrated, according to one or more embodiments. As shown IHS 110C may include magnetic field sensors 182A-182C on a back lid of IHS 110C. In one example, embodiments, magnetic field sensors 182A-182C may be or include Hall effect sensors. In another example, magnetic field sensors 182A-182C may include reed switches. As shown, housing 210 may include magnets 310A and 310B. In one or more embodiments, IHS 110 may sense and/or determine a presence of magnets 310A and 310B via magnetic field sensors 182A and 182B. For example, presence of one or more magnets may indicate a type of housing and/or an identification of a housing.

Figure 3J:
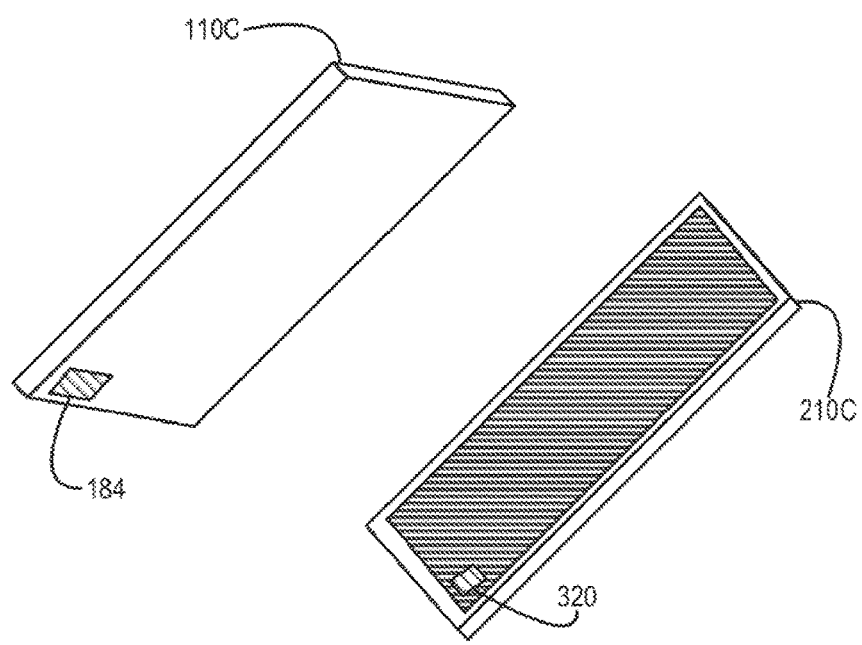
FIG. 3J illustrates an example of an information handling system that includes a near field communication sensor, according to one or more embodiments.

Turning now to FIG. 3J, an example of an information handling system that includes a near field communication sensor is illustrated, according to one or more embodiments. As shown, IHS 110C may include near field communication sensor 184 on a back lid of IHS 110C. In one or more embodiments, housing 210 may include a RFID device 320. In one example, 110 may receive information from RFID device 320, via near field communication sensor 184, that indicates a type of housing. In another example, IHS 110 may receive information from RFID device 320, via near field communication sensor 184, that indicates an identification of housing.

Figure 3K:
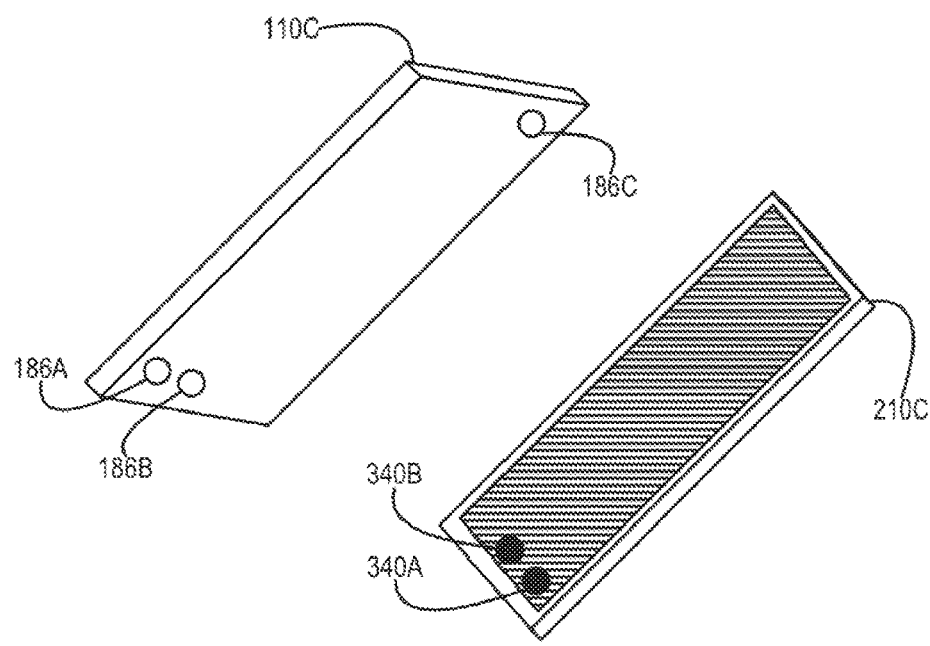
FIG. 3K illustrates an example of an information handling system that includes mechanical sensors, according to one or more embodiments.

Turning now to FIG. 3K, an example of an information handling system that includes mechanical sensors is illustrated, according to one or more embodiments. As shown, IHS 110C may include mechanical sensors 186A-186C on a back lid of IHS 110C. For example, embodiments, mechanical sensors 186A-186C may be or include switches. In one instance, one or more of mechanical sensors 186A-186C may be normally open. In another instance, one or more of mechanical sensors 186A-186C may be normally closed. In one or more embodiments, housing 210 may include one or more voids that may be utilized to not actuate respective one or more of mechanical sensors 186A-186C. For example, housing 210 may include one or more voids 340A and 340B. In one instance, housing 210 may not actuate mechanical sensors 186A and 186C via respective voids (e.g., holes) 340A and 340B. In another instance, housing 210 may actuate mechanical sensor 186B. In one or more embodiments, IHS 110 may sense and/or determine a presence of housing 210 via one or more of mechanical sensors 186A-186C. In one or more embodiments, actuating and/or not actuating of one or more of mechanical sensors 186A-186C may indicate a type of housing and/or an identification of a housing.

Figure 3L:
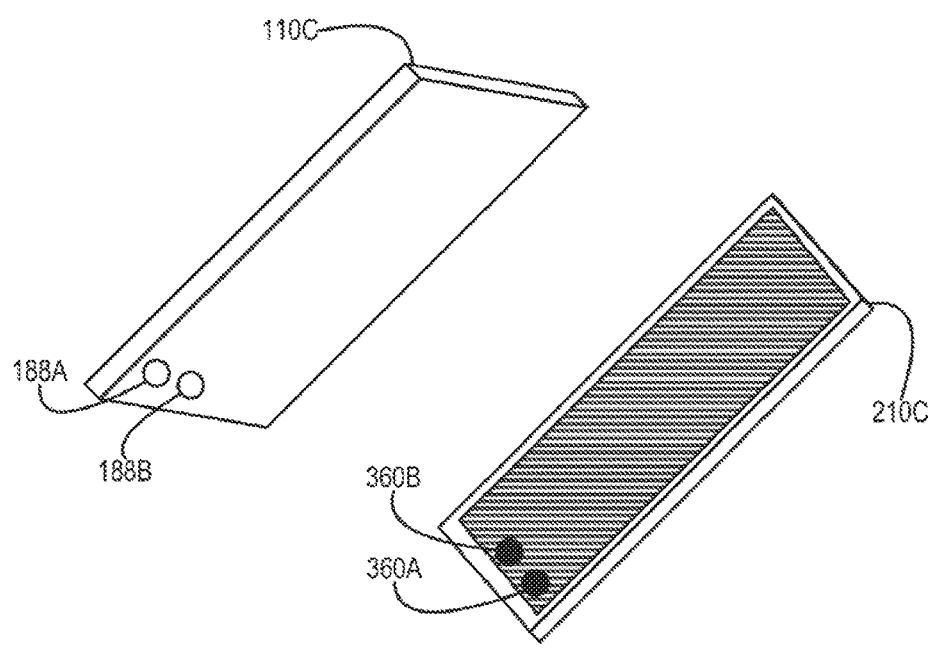
FIG. 3L an example of an information handling system that includes pogo pin sensors, according to one or more embodiments.

Turning now to FIG. 3L, an example of an information handling system that includes pogo pin sensors is illustrated, according to one or more embodiments. As shown, IHS 110C may include pogo pin sensors 188A and 188B on a back lid of IHS 110C. In one or more embodiments, a pogo pin sensor may be or include one or more springs and/or one or more conductors, among others. As shown, housing 210C may include conductors 360A and 360B. In one or more embodiments, IHS 110C may communicate with housing 210C via pogo pin sensors 188A and 188B and conductors 360A and 360B. For example, IHS 110C may receive information via communicating with housing 210C, and the received information may indicate a type of housing and/or an identification of a housing. For instance, housing 210C may include a processor and/or circuitry that may provide the information to IHS 110C. In one or more embodiments, housing 210C may include a fan (not specifically illustrated). For example, IHS 110C may provide information, via one or more of pogo pin sensors 188A and 188B, to housing 210C that may be utilized to control the fan (e.g., turning the fan on, turning the fan off, controlling a speed of the fan, etc.).

Figure 4:
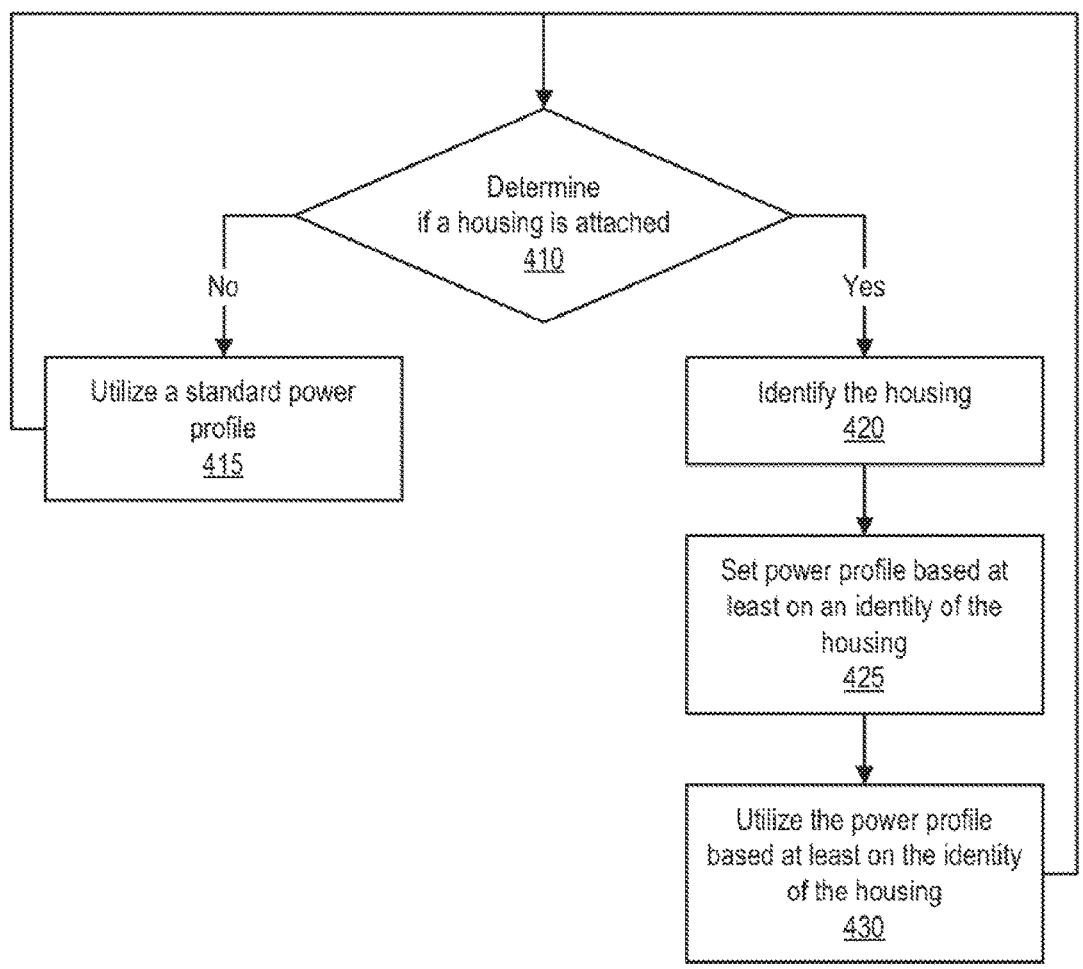
FIG. 4 illustrates an example of a method of operating an information handling system, according to one or more embodiments.

Turning now to FIG. 4, an example of a method of operating an information handling system is illustrated, according to one or more embodiments. At 410, it may be determined if a housing is attached to an information handling system. For example, IHS 110 may determine if a housing (e.g., a case) is attached to IHS 110. If a housing is not attached to the information handling system, the information handling system may utilize a standard power profile (e.g., a first operating profile), at 415. In one or more embodiments, the standard power profile may be or include a baseline power profile. For example, the baseline power profile may configure IHS 110. For instance, the baseline power profile may not permit a skin temperature of IHS 110 to exceed a temperature. In one or more embodiments, processor 120 may not exceed a first speed when IHS 110 is configured with the baseline power profile. In one or more embodiments, the method may proceed to 410. If a housing is attached to the information handling system, the housing may be identified, at 420. For example, IHS 110 may identify housing 210. In one or more embodiments, identifying the housing may include determining one or more of a type of the housing, a thickness of the housing, and a material of the housing, among others.

At 425, a power profile (e.g., a second operating profile) based at least on an identity of the housing may be set. For example, IHS 110 may set a power profile based at least on an identity of housing 210. In one or more embodiments, setting the power profile based at least on the identity of the housing may include configuring IHS 110 with the power profile based at least on the identity of the housing. At 430, the power profile based at least on the identity of the housing may be utilized. For example, IHS 110 may utilize the power profile based at least on the identity of the housing. For instance, IHS 110 may be configured to execute instructions at a second speed (e.g., the second speed is greater than the first speed), and processor 120 may execute instructions at the second speed. In one or more embodiments, the method may proceed to 410.

Figure 5:
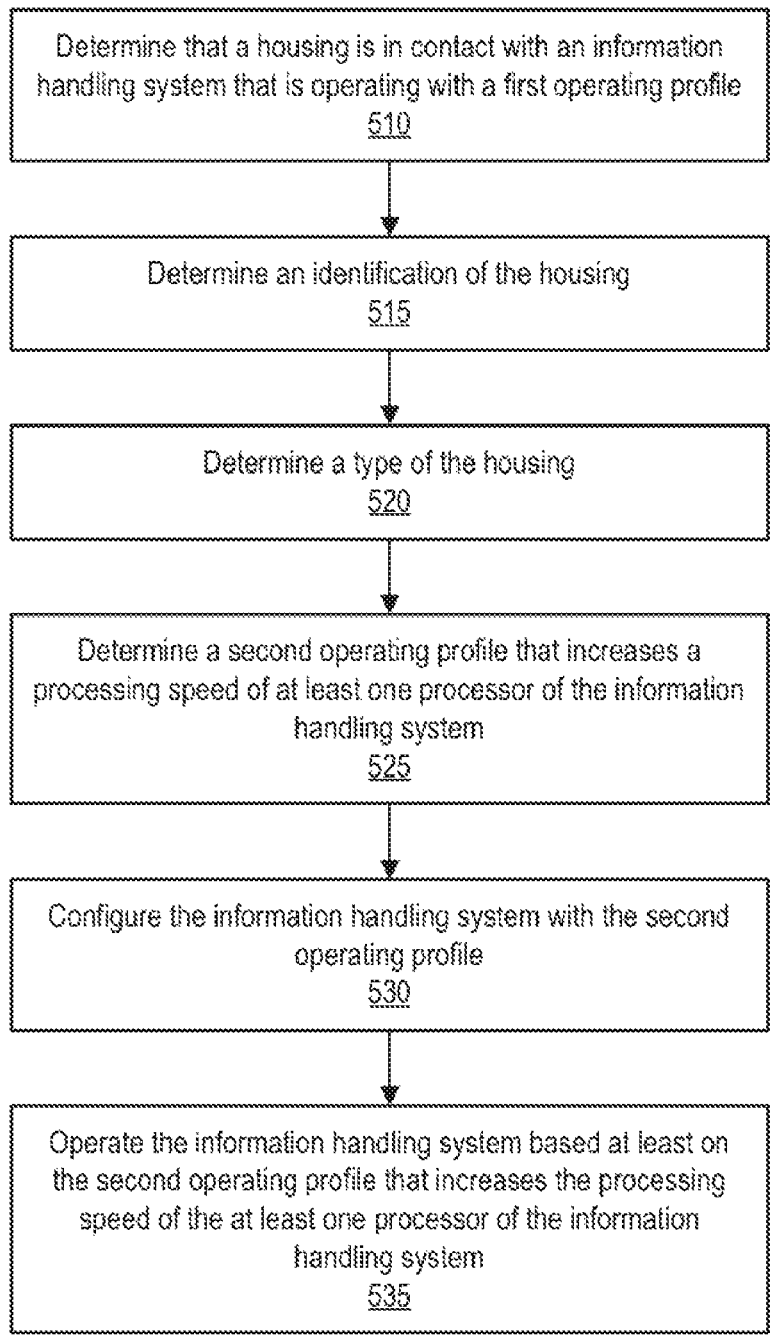
FIG. 5 illustrates another example of a method of operating an information handling system, according to one or more embodiments.

Turning now to FIG. 5, another example of a method of operating an information handling system is illustrated, according to one or more embodiments. At 510, it may be determined that a housing is in contact with an information handling system that is operating with a first operating profile. For example, IHS 110, operating with a first operating profile, may determine that housing 210 is in contact with IHS 110. For instance, the first operating profile may be or include a first power profile that permits a skin temperature of at least a portion of IHS 110 to be at or below a first temperature. In one or more embodiments, the first operating profile may limit a speed of processor 120 to a first speed. For example, processor 120 may permitted to and/or configured to operate up to the first speed (e.g., a first clock speed). In one or more embodiments, determining that the housing is in contact with the information handling system may include utilizing at least one of multiple pogo pins, at least one mechanical switch, at least one magnetic sensor, a near field communication sensor, and user input, among others. In one or more embodiments, IHS 110 may receive user input that indicates that the housing is in contact with IHS 110.

At 515, an identification of the housing may be determined. For example, IHS 110 may determine an identification of the housing. In one or more embodiments, determining an identification of the housing may include utilizing at least one of multiple pogo pins, multiple mechanical switches, multiple magnetic field sensors, a near field communication sensor, and user input, among others. In one or more embodiments, IHS 110 may receive user input that indicates the identification of the housing. At 520, a type of the housing may be determined. For example, IHS 110 may determine a type of the housing. In one or more embodiments, determining the type of the housing may include utilizing at least one of multiple pogo pins, multiple mechanical switches, multiple magnetic field sensors, a near field communication sensor, and user input, among others. In one or more embodiments, determining the type of the housing may include utilizing the identification of the housing. In one or more embodiments, determining the type of the housing may be based at least on the identification of the housing. In one or more embodiments, IHS 110 may receive user input that indicates the type of the housing.

At 525, a second operating profile of the information handling system that increases a processing speed of at least one processor of the information handling system may be determined. For example, IHS 110 may determine a second operating profile that increases a processing speed of at least one processor of IHS 110. For instance, the second operating profile may permit and/or configure processor 120 to operate up to a second speed (e.g., a second clock speed), greater than the first speed. In one or more embodiments, the second operating profile may be or include a second power profile that permits a skin temperature of at least a portion of IHS 110 to be at or below a second temperature, which is greater than the first temperature. For example, the second power profile may allow and/or permit a power consumption of processor 520 to be increased. For instance, the power consumption of processor 520 may be increased by one and one-half Watts, among others. In one or more embodiments, processor 120 may be or include multiple processors.

In one or more embodiments, determining the second operating profile of the information handling system that increases the processing speed of the at least one processor of the information handling system may be performed in response to determining that the housing is in contact with the information handling system. In one or more embodiments, determining the second operating profile of the information handling system that increases the processing speed of the at least one processor of the information handling system may be based at least on the type of the housing. In one or more embodiments, determining the second operating profile of the information handling system that increases the processing speed of the at least one processor of the information handling system may be based at least on the identification of the housing.

At 530, the information handling system may be configured with the second operating profile. For example, IHS 110 may configure itself with the second operating profile. For instance, IHS 110 may configure processor 120 to operate up to the second speed (e.g., the second clock speed). In one or more embodiments, IHSFW 172 may be configured with the second operating profile. At 535, the information handling system may operate based at least on the second operating profile that increases the processing speed of the at least one processor of the information handling system. For example, IHS 110 may operate based at least on second operating profile that increases the processing speed of the at least one processor of IHS 110. For instance, IHS 110 may operate with processor 120 operating up to the second speed. In one or more embodiments, operating IHS 110, based at least on the second operating profile, may permit a skin temperature of at least a portion of IHS 110 to be at or below a second temperature, greater than the first temperature.

Figure 6:
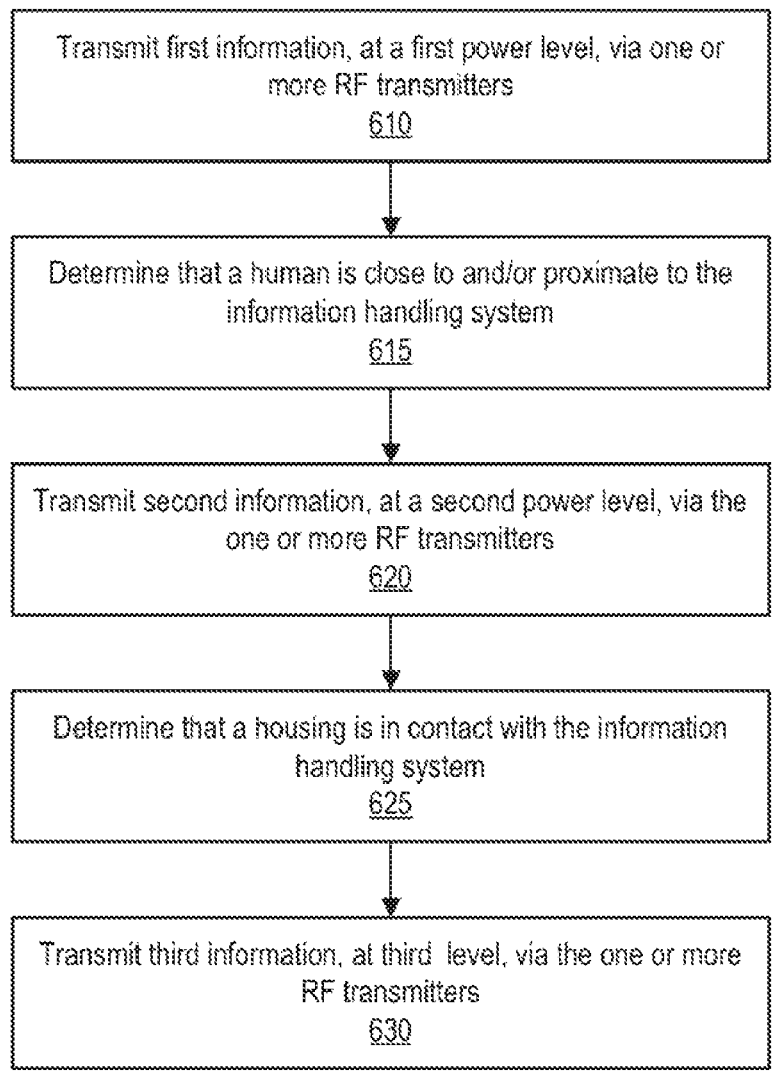
FIG. 6 illustrates an example of a method of transmitting information, according to one or more embodiments.

Turning now to FIG. 6, an example of a method of transmitting information is illustrated, according to one or more embodiments. At 610, first information may be transmitted via one or more RF transmitters at a first power level. For example, IHS 110 may include one or more one or more RF transmitters and may transmit first information via the one or more RF transmitters at a first power level. For instance, the one or more RF transmitters may transmit the first information via one or more antennas. In one or more embodiments, the one or more RF transmitters may include one or more WiFi transmitters, one or more Bluetooth transmitters, and/or one or more cellular telephone transmitters, among others.

At 615, it may be determined that a human is close to and/or proximate to an information handling system. For example, IHS 110 may determine that a human is close to and/or proximate to IHS 110. For instance, IHS 110 may include one or more proximity detectors that may detect a presence of a human and/or a distance of the human to IHS 110. In particular embodiments, determining that a human is close to and/or proximate to an information handling system may include detecting that the human is close to and/or proximate to the information handling system.

At 620, second information may be transmitted via the one or more RF transmitters at a second power level, less than the first power level. For example, the one or more RF transmitters of IHS 110 may transmit second information at a second power level. For instance, the one or more RF transmitters may transmit the second information via one or more antennas. In one or more embodiments, transmitting the second information at the second power level may be performed in response to determining that a human is close to and/or proximate to an information handling system. In one or more embodiments, determining the second power level may include utilizing dynamic power reduction (DPR) table to determine the second power level. For example, the DPR table may include information associated with the second power level to comply with a SAR that may be considered safe and/or acceptable for a human.

At 625, it may be determined that a housing is in contact with the information handling system. For example, IHS 110 may determine that a housing is in contact with IHS 110. At 630, third information may be transmitted via the one or more RF transmitters at a third power level, greater than the second power level. In one example, the third power level may be the first power level. In another example, the third power level may be greater than the second power level and less than the first power level. In one or more embodiments, the one or more RF transmitters of IHS 110 may transmit third information at a third power level, greater than the second power level. For example, the one or more RF transmitters may transmit the third information via one or more antennas. In one or more embodiments, transmitting the third information via the one or more RF transmitters at the third power level, greater than the second power level, may be performed in response to determining that the housing is in contact with the information handling system.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium that is coupled to the at least one processor and that includes instructions, which when executed by the at least one processor, cause the information handling system to:
   determine that a housing is in contact with the information handling system that is operating with a first operating profile;
   in response to determining that the housing is in contact with the information handling system;
   i) identify a dynamic power reduction (DPR) table that includes associations between operating profiles and specific absorption rates (SAR);
   ii) determine, based on the DPR table, a second operating profile of the information handling system that increases a processing speed of the at least one processor of the information handling system and that includes a thermal profile that permits the information handling system to have an increased skin temperature of the information handling system that complies with the corresponding SAR of the second operating profile; and
   operate the information handling system based at least on the second operating profile that increases the processing speed of the at least one processor of the information handling system, which produces additional heat that causes the increased skin temperature of the information handling system.

2. The information handling system of claim 1,
wherein the memory medium further comprises instructions, which when executed by the at least one processor, further cause the information handling system to:
determine a type of the housing; and
wherein, to determine the second operating profile, the memory medium further comprises instructions, which when executed by the at least one processor, further cause the information handling system to:
determine the second operating profile based at least on the type of the housing.

3. The information handling system of claim 2, wherein, to determine the type of the housing, the memory medium further comprises instructions, which when executed by the at least one processor, further cause the information handling system to:
utilize at least one of a plurality of pogo pins, a plurality of mechanical switches, a plurality of magnetic field sensors, and a near field communication sensor.

4. The information handling system of claim 1,
wherein the memory medium further comprises instructions, which when executed by the at least one processor, further cause the information handling system to:
determine an identification of the housing; and
wherein, to determine the second operating profile, the memory medium further comprises instructions, which when executed by the at least one processor, further cause the information handling system to:
determine the second operating profile based at least on the identification of the housing.

5. The information handling system of claim 4, wherein, to determine the identification of the housing, the memory medium further comprises instructions, which when executed by the at least one processor, further cause the information handling system to:
utilize at least one of a plurality of pogo pins, a plurality of mechanical switches, a plurality of magnetic field sensors, and a near field communication sensor.

6. The information handling system of claim 4, wherein the memory medium further comprises instructions, which when executed by the at least one processor, further cause the information handling system to:
determine a type of the housing based at least on the identification of the housing.

7. The information handling system of claim 1, further comprising:
one or more radio frequency (RF) transmitters, coupled to the at least one processor and configured to transmit information in a wireless fashion;
wherein the memory medium further comprises instructions, which when executed by the at least one processor, further cause the information handling system to:
transmit first information, at a first power level, via the one or more RF transmitters;
determine that a human is proximate to the information handling system;
in response to determining that the human is proximate to the information handling system, transmit second information, at a second power level, via the one or more RF transmitters, wherein the second power level is less than the first power level;
in response to determining that the housing is in contact with the information handling system, transmit third information, at a power level greater than the second power level, via the one or more RF transmitters.

8. A method, comprising:
an information handling system determining that a housing is in contact with the information handling system that is operating with a first operating profile;
in response to the information handling system determining that the housing is in contact with the information handling system, the information handling system:
  i) identify a dynamic power reduction (DPR) table that includes associations between operating profiles and specific absorption rates (SAR);
  ii) determining, based on the DPR table, a second operating profile of the information handling system that increases a processing speed of at least one processor of the information handling system and that includes a thermal profile that permits the information handling system to have an increased skin temperature of the information handling system that complies with the corresponding SAR of the second operating profile; and
the information handling system operating the information handling system based at least on the second operating profile that increases the processing speed of the at least one processor of the information handling system, which produces additional heat that causes the increased skin temperature of the information handling system.

9. The method of claim 8, further comprising:
determining a type of the housing;
wherein the determining the second operating profile is based at least on the type of the housing.

10. The method of claim 9, wherein the determining the type of the housing includes utilizing at least one of a plurality of pogo pins, a plurality of mechanical switches, a plurality of magnetic field sensors, and a near field communication sensor.

11. The method of claim 8, further comprising:
determining an identification of the housing; and
wherein the determining the second operating profile is based at least on the identification of the housing.

12. The method of claim 11, wherein the determining the identification of the housing includes utilizing at least one of a plurality of pogo pins, a plurality of mechanical switches, a plurality of magnetic field sensors, and a near field communication sensor.

13. The method of claim 11, further comprising:
determining a type of the housing based at least on the identification of the housing.

14. The method of claim 8, further comprising:
transmitting first information, at a first power level, via one or more radio frequency (RF) transmitters;
determining that a human is proximate to the information handling system;
in response to the determining that the human is proximate to the information handling system, transmitting second information, at a second power level, via the one or more RF transmitters, wherein the second power level is less than the first power level;
in response to the determining that the housing is in contact with the information handling system, transmitting third information, at a power level greater than the second power level, via the one or more RF transmitters.

15. A computer-readable non-transitory memory medium that includes instructions that, when executed by at least one processor of an information handling system, cause the information handling system to:

determine that a housing is in contact with the information handling system that is operating with a first operating profile;

in response to determining that the housing is in contact with the information handling system;

i) identify a dynamic power reduction (DPR) table that includes associations between operating profiles and specific absorption rates (SAR);

ii) determine, based on the DPR table, a second operating profile of the information handling system that increases a processing speed of the at least one processor of the information handling system and that includes a thermal profile that permits the information handling system to have an increased skin temperature of the information handling system that complies with the corresponding SAR of the second operating profile; and operate the information handling system based at least on the second operating profile that increases the processing speed of the at least one processor of the information handling system, which produces additional heat that causes the increased skin temperature of the information handling system.

16. The computer-readable non-transitory memory medium of claim 15, wherein the computer-readable non-transitory memory medium further comprises instructions, which when executed by the at least one processor, further cause the information handling system to:

determine a type of the housing; and wherein, to determine the second operating profile, the computer-readable non-transitory memory medium further comprises instructions, which when executed by the at least one processor, further cause the information handling system to:

determine the second operating profile based at least on the type of the housing.

17. The computer-readable non-transitory memory medium of claim 16, wherein, to determine the type of the housing, the computer-readable non-transitory memory medium further comprises instructions, which when executed by the at least one processor, further cause the information handling system to:

utilize at least one of a plurality of pogo pins, a plurality of mechanical switches, a plurality of magnetic field sensors, and a near field communication sensor.

18. The computer-readable non-transitory memory medium of claim 15, wherein the computer-readable non-transitory memory medium further comprises instructions, which when executed by the at least one processor, further cause the information handling system to:

determine an identification of the housing; and wherein, to determine the second operating profile, the computer-readable non-transitory memory medium further comprises instructions, which when executed by the at least one processor, further cause the information handling system to:

determine the second operating profile based at least on the identification of the housing.

19. The computer-readable non-transitory memory medium of claim 18, wherein, to determine the identification of the housing, the computer-readable non-transitory memory medium further comprises instructions, which when executed by the at least one processor, further cause the information handling system to:

utilize at least one of a plurality of pogo pins, a plurality of mechanical switches, a plurality of magnetic field sensors, and a near field communication sensor.

20. The computer-readable non-transitory memory medium of claim 18, wherein the computer-readable non-transitory memory medium further comprises instructions, which when executed by the at least one processor, further cause the information handling system to:

determine a type of the housing based at least on the identification of the housing.

* * * * *